(12) United States Patent
van Gijsel et al.

(10) Patent No.: US 7,150,078 B2
(45) Date of Patent: Dec. 19, 2006

(54) SUSPENSION SYSTEM

(75) Inventors: Geert van Gijsel, Goirle (NL); Peter Naaijkens, Tilburg (NL); Raymond S. Laughlin, Garfield Heights, OH (US)

(73) Assignee: Erico International Corporation, Solon, OH (US)

( * ) Notice: Subject to any disclaimer, the term of this patent is extended or adjusted under 35 U.S.C. 154(b) by 111 days.

(21) Appl. No.: 11/085,702

(22) Filed: Mar. 21, 2005

(65) Prior Publication Data

US 2005/0160563 A1 Jul. 28, 2005

Related U.S. Application Data

(62) Division of application No. 10/919,880, filed on Aug. 17, 2004, which is a division of application No. 10/392,541, filed on Mar. 20, 2003.

(60) Provisional application No. 60/371,978, filed on Apr. 12, 2002.

(51) Int. Cl.
*F18G 11/04* (2006.01)
(52) U.S. Cl. .................... 24/115 M; 248/328; 248/340
(58) Field of Classification Search ................ 248/328; 362/391, 453
See application file for complete search history.

(56) References Cited

U.S. PATENT DOCUMENTS

| | | | |
|---|---|---|---|
| 1,391,457 A | 9/1921 | Buckley et al. | |
| 1,547,677 A * | 7/1925 | Ouellet | 24/130 |
| 2,190,661 A | 2/1940 | Hauer | |
| 2,572,615 A * | 10/1951 | Hansen | 248/317 |
| 2,819,923 A | 1/1958 | Anderson | |
| 4,178,661 A * | 12/1979 | Klein | 24/130 |
| 4,519,564 A | 5/1985 | Nadherny | |
| 5,423,108 A | 6/1995 | Brennan | |
| 5,551,901 A * | 9/1996 | Jaeger | 441/6 |
| 6,003,210 A | 12/1999 | Facey et al. | |

FOREIGN PATENT DOCUMENTS

| | | |
|---|---|---|
| CA | 2 268 463 | 10/2000 |
| CH | 687 221 | 10/1996 |
| FR | 2 832 778 | 5/2003 |
| GB | 658 036 | 10/1951 |
| GB | 2 247 926 | 3/1992 |
| GB | 2 257 117 | 1/1993 |
| WO | WO 89/01455 | 2/1989 |
| WO | WO 93/04303 | 3/1993 |

* cited by examiner

*Primary Examiner*—Robert J. Sandy
(74) *Attorney, Agent, or Firm*—Renner, Otto, Boisselle and Sklar, LLP (57) ABSTRACT

A suspension or staying system uses a length of wire or cable with a hook or plain bead secured to one end. The hook may be secured directly or indirectly to a structure. The other or free end of the wire or cable is extended through a jam cleat and around an object to be suspended or stayed, and then back through the jam cleat to form a tightenable, adjustable loop simply by pulling on the free end. Without the jam cleat and the adjustable loop, a fixture cleat may be employed to grip the wire or cable at any location for support or staying of objects such as light fixtures.

34 Claims, 12 Drawing Sheets

FIG. 33

SUSPENSION SYSTEM

This application is filed as a divisional application and claims priority of U.S. Ser. No. 10/919,880, Filed Aug. 17, 2004, which is a divisional application of U.S. Ser. No. 10/392,541, filed Mar. 20, 2003, which claims the benefit of U.S. Provisional application Ser. No. 60/371,978, filed Apr. 12, 2002.

DISCLOSURE

This invention relates generally as indicated to a suspension system; one for suspending or hanging facilities such as cables, pipe, conduit, or duct, for example, and more particularly to a simplified and easy to install system and method including stronger, easier to use seismic resistant jam cleats for pulling wire or cable taut after encircling such facilities and any appropriate supporting structure, and to a cable termination or cleat especially useful for supporting objects without looping or encircling the object.

BACKGROUND OF THE INVENTION

In building construction and reconstruction, utilities and other facilities such as piping, conduit, duct, light fixtures, and communications wiring, for example, are commonly supported from building structural elements such as beams, purlins, trusses, roofs, or concrete floors above a suspended ceiling. These facilities are usually secured in place by a wide variety of hangers or suspenders, ranging from clips or clamps to wire or chain. Examples of such construction fasteners and hangers are sold under the well-known CADDY® trademark by Erico International Corporation of Solon, Ohio U.S.A. Wires have been widely used for suspension of such items including the suspended ceiling itself.

Wire or cable kits have also been employed for suspension purposes and examples may be seen in U.S. Pat. Nos. 2,819,923 and 6,003,210. Both use a wire sling with a loop at one end and an adjustable cleat forming a loop around the object suspended. The problem with both is that the bottom or free end of the length of wire or cable has to be passed over the structural object, through the loop on the upper end, and then pulled tight. If the cleat is on the wire, it may have to be removed and reattached, particularly if there is a clearance problem above or through the structural object. The thread-through loop system of the prior patents also limits the possibility of securing the length of wire to the suspended or stayed object first, and then to the structure for final adjustment. Some suspended objects require lateral stability, particularly in seismic zones, so that the length of wire is not always plumb. Also, the wire may be used to form a horizontal catenary between two structural members and from which additional wire slings may be used to support or stay other objects.

The noted prior patents illustrate cleats for forming adjustable loops where the cleat is designed to accommodate a single or limited size of wire. Also, both use a low angle wedge surface to grip the wire against a linear surface. In the earlier patent, the wedge surface is the threads of the set screw. If adjustment or repositioning is required, it is not always easy to release the grip on the wire, or a special tool may be required. It would be desirable if the cleat would accommodate a range of wire sizes, and for each provide a tighter, more secure grip, and yet one which is easily released.

It would also be desirable to have a cleat which optionally can be locked in its cable or wire gripping condition so that seismic anomalies or vibrations cannot release the wire or cable, even momentarily.

It would further be desirable for the suspension system to include cleats or terminations which would enable the system to be attached directly or indirectly to various devices or objects such as light fixtures so that they could be hung or supported without encircling the object with a loop.

SUMMARY OF THE INVENTION

This invention utilizes a wire sling suspension system and kit where a loop at one end may be made without threading the other end through a pre-formed loop. The system also utilizes a swing jaw jam cleat to form an adjustable loop around the object suspended or stayed, which has great flexibility yet superior grip strength and which can accommodate a variety of wire sizes. In one embodiment the swing jaw of the jam cleat may be locked in place to avoid unwanted release in the event the structure may be subject to anomalous movements or vibrations as may occur in a seismic event. The system further includes a fixture cleat which enables the system to be attached directly or indirectly to various objects without encircling the object.

In one aspect of the present invention the suspension or staying system or kit includes a length of flexible wire with a hook secured to one end. This enables the one end to be placed over a structure and latched or snapped in place to the length of wire to form a loop without threading the bottom or other end over the structure and through a loop. The hook may also include a bead, and either the hook or bead may be used with other fasteners to support and stay objects. A jam cleat is included to form an adjustable loop with the other or free end of the length of wire, and the jam cleat may be locked in gripping condition for seismic applications.

It is another important aspect to provide a jam cleat for wire or cable sling systems comprising a body having at least one wire or cable passage therein, a chamber communicating with the passage, and a lever arm pivoted in the chamber and including a distal wire gripping surface movable on an arc operative to interfere with and wedge a wire or cable moving in said passage in one direction but not in the opposite direction. In one embodiment the jam cleat lever arms may be locked in gripping position for seismic applications.

A specific fixture cleat or termination is also provided which may secure the cable to an object such as a light fixture without requiring that the wire or cable encircle the object. The special cleat or termination may be field formed and include optional parts depending on the type of fixture supported and the manner of support desired.

It is also an aspect that the hook be part of a bead so that it can be used with a clip to form a loop at the upper end of the length of wire again not requiring that the bottom end be threaded over a structure or through a loop.

It is a further aspect to provide a method of staying an object with respect to a structure comprising the steps of providing a wire with a beaded or hooked end; threading the beaded or hooked end through or around a structure; locking the beaded or hooked end to the wire to form a loop around the structure; pulling the opposite end of the wire to tighten the loop; feeding the opposite free end of the wire through a jam cleat and around an object, and again through the jam cleat to form an adjustable loop around the object; and then pulling the free end of the wire to tighten the loop around the object and suspend the object with respect to the structure.

The jam cleat may be locked in seismic applications. Alternatively, the beaded or hooked end may be used directly with other fasteners not requiring the loop around the structure.

The process also encompasses forming a fixture cleat or termination on the wire or cable during field installation so that the wire or cable may be attached directly to the object without looping around the object. The fixture cleat may include a fittling rotatable on the axis of the wire or cable.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figures 1, 2:
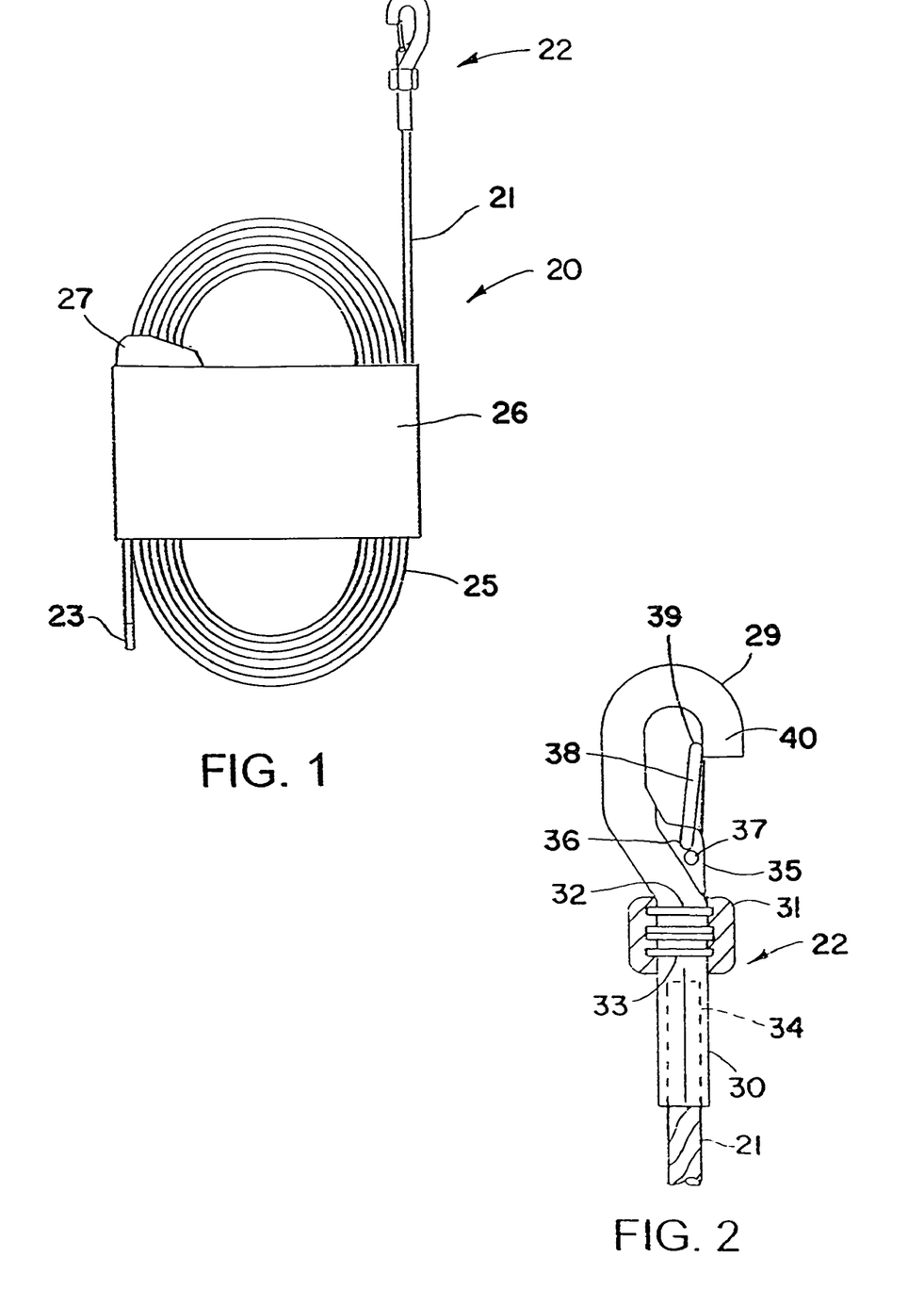
FIG. 1 is an assembly of the kit or package of the preferred embodiment of the suspension system of the present invention.
FIG. 2 is an enlarged fragmentary partly in section illustration of the hook assembly of the FIG. 1 embodiment.

Referring initially to FIG. 1, there is illustrated a kit for a suspension system shown generally at 20 in accordance with the present invention. The components of the system include a length of cable or wire shown generally at 21. The wire has a beaded and hooked end 22 and a free end 23. The wire is coiled as indicated at 25 and held in such coil form by a plastic or paper sleeve indicated at 26. The wire or cable may also extend through a jam cleat shown generally at 27 which is part of the package or kit.

The wire 21 may, for example, be galvanized steel wire rope and vary in diameter from approximately 1 mm to 6 mm or more. The length may also vary from about 1 meter to several meters or more. The free end of the wire indicated at 23 is cut by welding or hot tin dipped over a length of about 6 mm to prevent unraveling.

Figure 3:
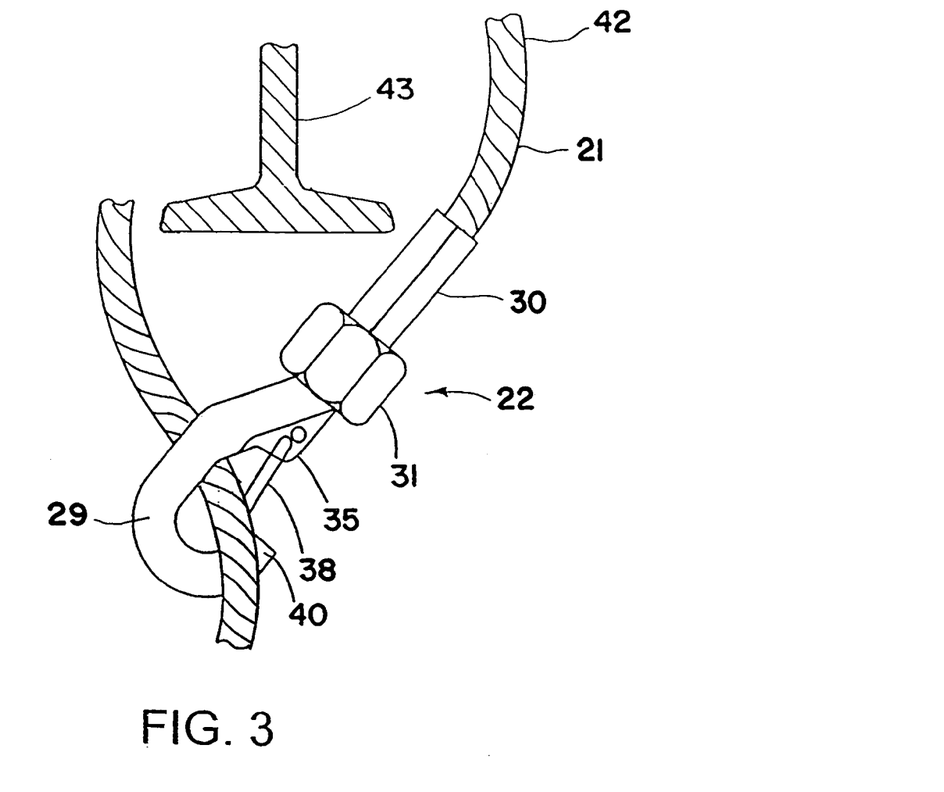
FIG. 3 is a fragmentary illustration of the cable or wire forming a tightenable loop around a structure.

Referring now additionally to FIGS. 2 and 3, it will be seen that the hooked and beaded end 22 of the length of wire or cable indicated at 22 is formed from several pieces including the hardened steel hook 29, a cable crimp sleeve 30, and a hexagonal enlarged bead 31 forming a crimp sleeve joining the parts 29 and 30. As indicated in FIG. 2 each of the parts 29 and 30 may be provided with one or more rings or flanges indicated at 32 and 33, respectively, around which the hexagonal bead forming crimp sleeve 31 flows to lock the two parts together when joined as illustrated in FIG. 2. The crimp sleeve 30 includes a hollow center indicated at 34 which receives the end of the length of cable and secures the hook assembly to the cable when the crimp sleeve 30 is tightly compressed.

The hook also includes a tongue 35 having slightly offset lateral holes 36 and 37 receiving the in-turned ends of spring bail 38. The slightly offset holes cause the spring bail to be urged in a clockwise direction as seen in FIG. 2 with the tip of the bail indicated at 39 abutting against the inside of the hook tip seen at 40. In this manner the cable wire may be snapped into the interior of the hook and the spring bail will snap or latch back to the closed position seen in FIG. 2.

As indicated in FIG. 3, the hooked and beaded end can be used quickly to form a loop shown generally at 42, encircling a structure such as I-beam 43. The loop may be formed by simply snapping the hook on the length of cable wire and the loop can be tightened by pulling on the length of wire or cable from the bottom as seen in FIG. 3.

Figure 4:
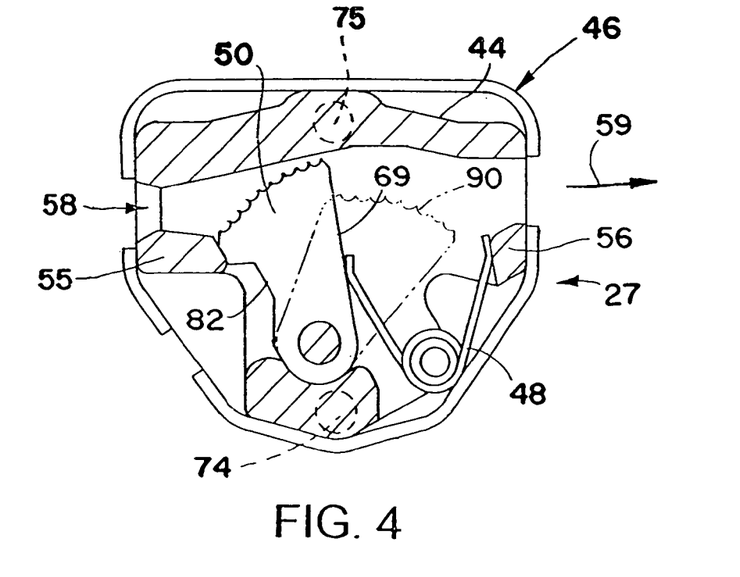
FIG. 4 is a longitudinal section through one wire path of the jam cleat with the wire being threaded from left to right as seen.
Figure 5:
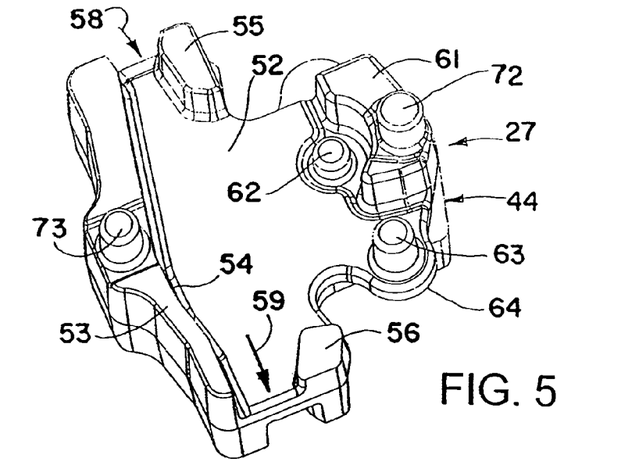
FIG. 5 is a perspective view of the jam cleat body showing one side.
Figure 6:
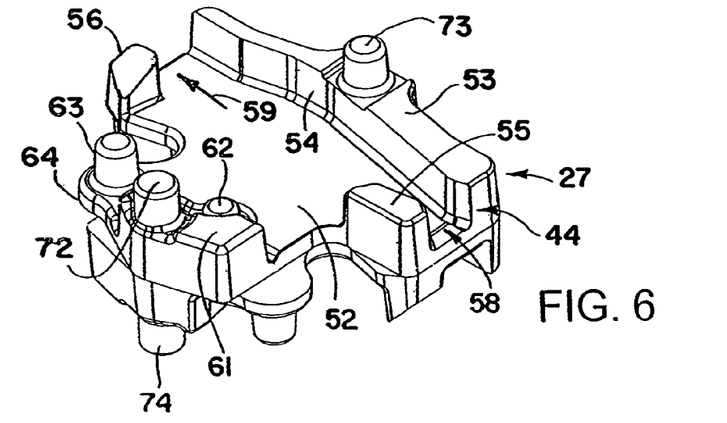
FIG. 6 is a perspective view of the same side of the body from a different viewpoint.

Referring now to FIGS. 4–10, it will be seen that the jam cleat 27 includes a body 44 shown in FIGS. 5 and 6, covers 45 and 46, coil springs 47 and 48, and locking levers 49 and 50. Both covers are identical to each other as are the springs and locking levers. It should be kept in mind that FIG. 4 is a fragmentary longitudinal section through the far side wire path of the jam cleat with the wire being threaded from left to right as seen, and as such is a mirror image of the near side of the jam cleat seen more clearly in FIG. 7. However, when viewed from opposite sides, the two sides of the jam cleat are the same.

The body 44 as seen perhaps more clearly in FIGS. 5 and 6 is formed of a suitable diecasting and includes a central septum or wall indicated 52 which divides the body into two opposite sides. The body is the general shape of a T with the top of the T being formed to the left and right in FIGS. 5 and 6, respectively. The top of the T includes a wall shown at 53 projecting transversely of the stem and which includes a generally curved interior wire gripping wall shown at 54. Opposite the ends of the wall 53 are two projections shown at 55 and 56. The projection 55 along with the wall 53 provides a flared entrance for the wire or cable as indicated by the arrow 58. The space between the projection 56 and the opposite end of the wall 53 is where the cable or wire exits the body as shown by arrow 59.

Figure 7:
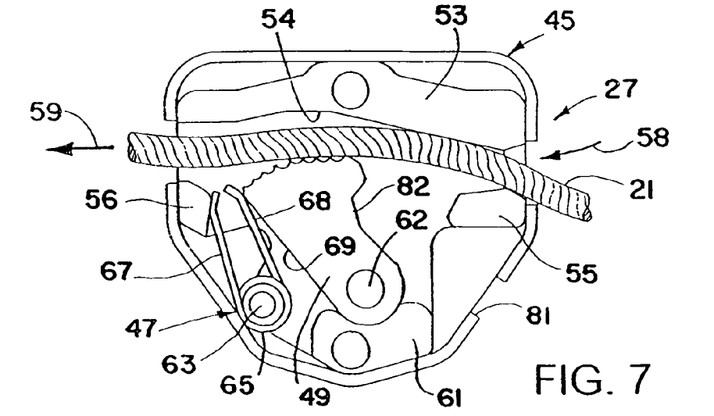
FIG. 7 is a plan view of the jam cleat with a cover removed showing the other wire path with the wire being threaded from right to left as seen, and also illustrating how the jam cleat may accommodate a variety of wire sizes.
Figure 8:
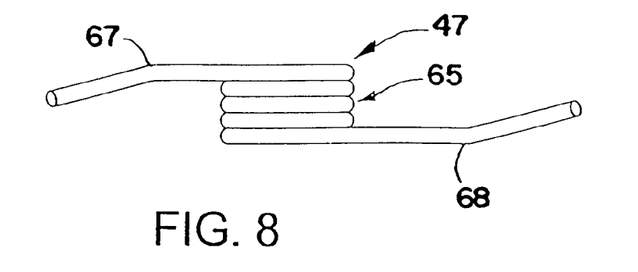
FIG. 8 is an enlarged side elevation of one of the springs employed with the jam cleat.

The stem of the T opposite the wall 53 is provided with an enlargement at 61 which is the same height as the wall 53. Immediately interior of the enlargement 61 is a pintle 62 on which the locking lever or catch 49 is pivoted. Just to the left of the pintle 62 in FIG. 6 is another pintle 63 which projects from lateral shelf 64. The pintle 63 supports the coiled center 65 of the coiled spring 47. The two arms 67 and 68 of the spring bear against the projection 56 and the wall 69 of the locking lever or catch 49. The spring urges the locking levers or catches to pivot clockwise as seen in FIG. 7, or counterclockwise as seen in FIG. 4.

The body is provided with cylindrical projections indicated at 72 and 73 for the side seen in FIGS. 5 and 6, and at 74 and 75 for the opposite side. These projections act as rivets and fit within the holes 76 and 77 in the covers 45 or 46. The rivet projections may then be deformed to secure the covers in place.

Figure 9:
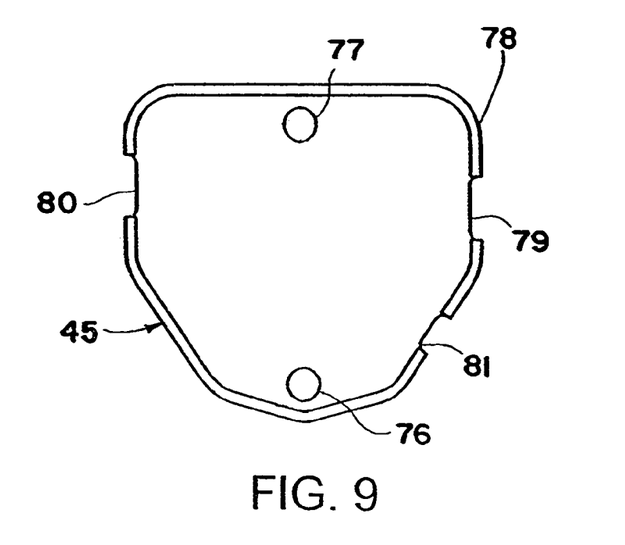
FIG. 9 is an enlarged underside plan view of one of the covers for the jam cleat.

Referring now to FIG. 9, it will be seen that each cover is provided with a rim or edge 78 and that such edge is provided with notches or recesses which correspond to certain parts of the body. The recess 79 may correspond to the entrance while the recess 80 may correspond to the wire exit. There is also provided a recess at 81 which provides access to recess 82 formed in the wall 84 of the locking lever or catch seen in FIG. 10. In this manner by inserting a suitable tool through the hole or recess 81 and engaging the recess 82, the locking lever may be forced away from the cable or wire compressing the spring to release the cable or wire from the grip of the lever. Removal of the tool permits the spring again to force the locking lever into gripping engagement with the wire or cable.

Figure 10:
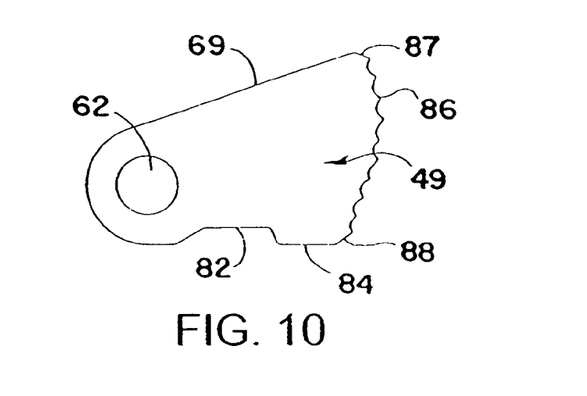
FIG. 10 is an enlarged plan view of one of the locking levers or catches of the jam cleat.

As seen more clearly in FIG. 10, the locking lever or catch 49 is provided with a serrated jaw surface 86, the serrations of which are carefully formed to avoid sharp edges which might cut individual strands of the cable or wire. It is noted that serrated surface is not a generally radial surface with respect to the pivot center 62. The surface starts at the point 87 which is considerably further from the pivot center than the point 88 at the opposite end of the surface in the direction of the pivot caused by the force of the spring. This enables the jam cleat fully and properly to grip a range of wire sizes. For example, the illustrated jam cleat is suitable for locking and gripping cable or wire sizes which may vary from about 1 mm in diameter to about 3 mm. FIG. 7 illustrates the position of the locking lever when gripping a larger size wire or cable. FIG. 4 shows such position in phantom lines at 90. Even without a cable, the locking lever almost engages the opposed curved wall as seen in FIG. 4 and is sufficiently close to that wall firmly to grip a 1 mm wire. A larger size jam cleat may grip wire in the range of about 4 to 6 or more millimeters, for example.

Figure 11:
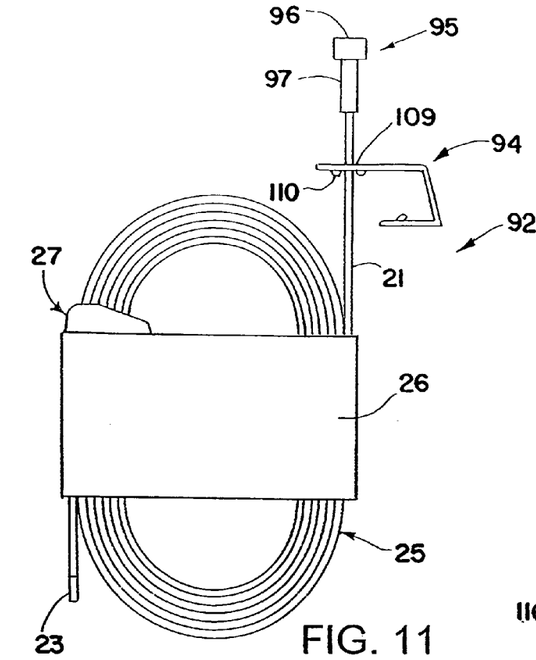
FIG. 11 is a view like FIG. 1 but illustrating another embodiment of the invention using a bead and clip to form the loop around the structure.
Figure 12:
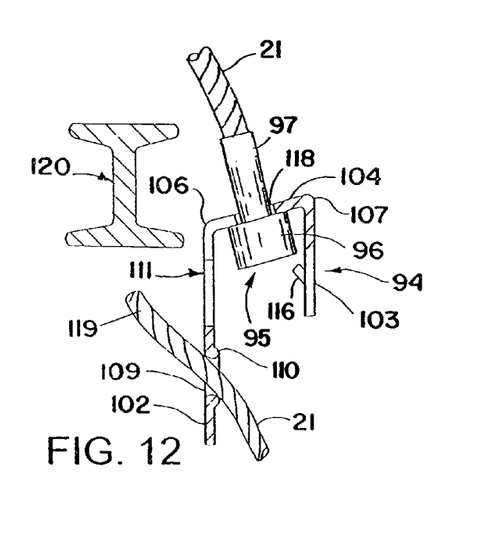
FIG. 12 is an illustration of a loop being formed around a structure with the embodiment of FIG. 11.
Figure 13:
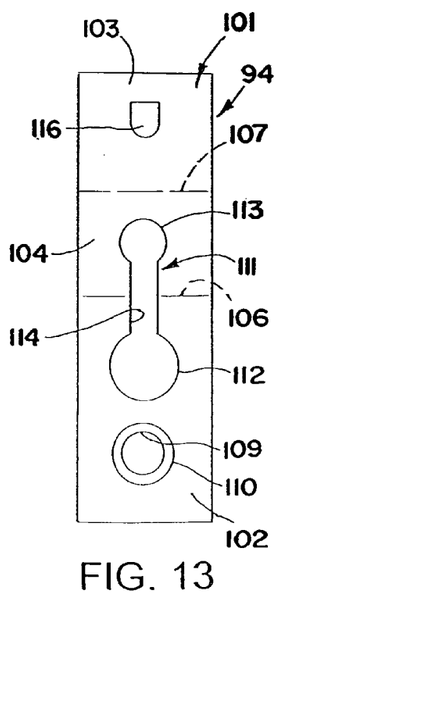
FIG. 13 is an illustration of the blank used to form the clip seen in FIGS. 11 and 12 illustrating the bead receiving slot.

Referring now to FIGS. 11, 12 and 13 there is illustrated a plain bead embodiment shown generally at 92 which includes a length of cable or wire 21 coiled as indicated at 25 and wrapped in package or sleeve 26 and having a free end 23 with the wire passing through jam cleat 27. The wire also passes through a J-clip shown generally at 94 and has a plain beaded end indicated at 95.

The beaded end 95 of the wire or cable may be formed after the clip is threaded on the end of the wire or cable. The integrally formed axially extending shank or nipple 97 may be crimped or swaged on the end of the wire or cable to provide a strong connection.

Referring now additionally to FIGS. 12 and 13, it will be seen that the clip shown generally at 94 is formed from the blank shown at 101 in FIG. 13 to have the generally J-shaped configuration seen in FIGS. 11 and 12. As indicated in FIG. 12, the clip includes a longer leg 102, a shorter, generally parallel leg 103 and a connecting bottom wall 104 having a somewhat skewed angle. The bend lines forming the various legs and walls of the clip are shown at 106 and 107 in FIG. 13. These become corners 106 and 107 seen in FIG. 12.

The longer leg 102 is provided with a hole 109 having a beaded or rolled edge 110 and the cable or wire 21 is threaded through the hole 109. The rolled edge avoids engaging the wire or rope with a sharp edge.

The clip also includes a bayonet slot shown generally at 111. The slot includes a larger circular end 112, a smaller circular end 113, and an interconnecting narrow slot 114. As indicated in FIGS. 12 and 13, but more clearly in FIG. 13, the narrow slot 114 extends around the bend or form line 106 so that the smaller circular end 113 is substantially in the middle of the bottom wall 104 while the larger circular opening 112 is in the longer sidewall 102.

The size of the circular opening 112 is designed closely to accommodate the cylindrical bead or nub 96 on the end of the wire or cable. The size of the smaller circular opening 113 is designed to accommodate the shank or nipple 97, but not the bead 96. The narrow slot 114 between the two openings accommodates the wire or cable, but not the shank or nipple 97.

As indicated in both FIGS. 11 and 12, the axial length of the shank or nipple is substantially longer than the axial length of the bead. In order for the wire or cable to move through the slot 114, the beaded end of the wire or cable has to be inserted through the opening 112 far enough so that the shank or nipple clears the slot 114 to enable the beaded end to move from the larger opening 112 to the smaller opening 113 around the corner 106. The same is true, of course, if the beaded end is to be disconnected from the clip.

In order to prevent the beaded end from moving axially within the opening 113, the shorter leg 103 is provided with an interference strike or projection indicated at 116 which extends into the interior of the clip. In order for the bead to clear the interference strike, it has to be tilted in a clockwise direction from its axial position shown in FIG. 12. Sufficient clearance for such tilting is provided between the opening and the shank as shown at 118 in FIG. 12. This means that any load on the cable or wire has to be relieved before the beaded end can be tilted and inserted through the opening far enough to permit the shank or nipple to clear the narrow slot 114 to enable the wire or cable to move around the corner to align the enlarged beaded end with the enlarged opening 112. Only the tilting of the beaded end of the wire or cable will permit the beaded end to clear the interference projection 116.

As can be seen from FIG. 12, the beaded end of the wire or cable may quickly be used to form a loop shown partially at 119 around a suitable structure such as the I-beam 120. The bead 96 is inserted through the opening 112 far enough so that the cable will fit through the slot 114. The bead is then seated at the opening 113 as illustrated and the wire or cable is pulled to tighten the noose or loop around the structure 120. All of this may be accomplished even before the coil or bundle of wire is fully removed from the sleeve or package 26.

Figure 14:
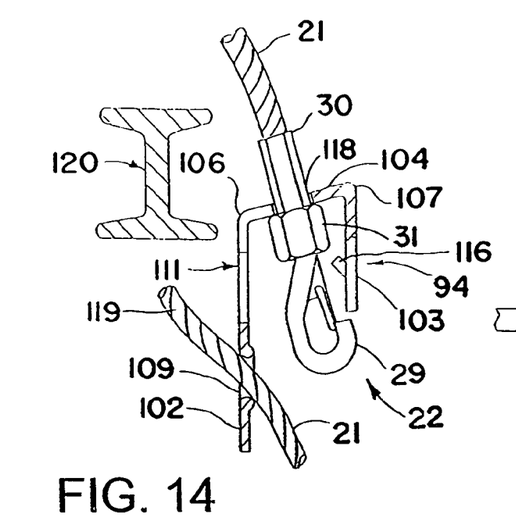
FIG. 14 is an illustration of the hooked end embodiment used with the clip of FIGS. 11–13 to form a structure encircling loop.

Referring now to FIG. 14, there is illustrated a view like FIG. 12 but illustrating the hooked end embodiment of FIG. 1 used with the clip 94 to form the loop 119 around the structure or I-beam 120. The hooked end may be inserted in the clip in the same way as the plain beaded end 95, and inserted far enough to clear sleeve 30 to enable the cable or wire to move through the narrow portion of the bayonet slot 111. When seated at the smaller opening as shown in FIG. 11, the enlarged bead 31 underlies the strike 116 to require that any load on the loop formed be relieved before the loop can be disconnected. The clearance 118 enables the hooked end to be tilted for removal once the load is removed.

Figure 15:
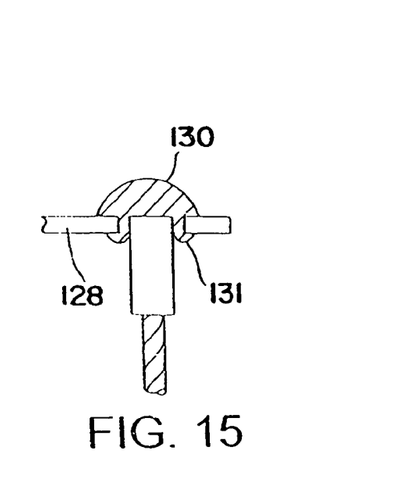
FIG. 15 is an illustration of the beaded end swaged or pressed into the hole of a purlin clip, for example.
Figure 16:
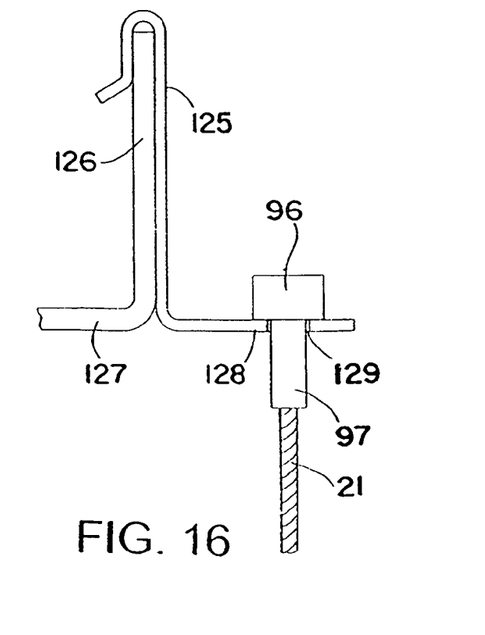
FIG. 16 is a fragmentary elevation of the beaded end supported and suspended from a CADDY® construction fastener such as a purlin clip.

Referring now to FIGS. 15 and 16, it will be seen that the cable or wire with the plain beaded end may be secured to an intermediate fastener such as seen at 125. The fastener 125 is a snap-on clip which has been snapped over the flange 126 of a purlin 127, for example. The fastener 125 includes a horizontal portion 128 with a hole 129.

In FIG. 16, the free end of the length of cable wire has simply been threaded down through the hole 129 after the clip 94 is removed. The enlarged bead or head 96 won't fit through the hole 129 and thus the length of cable is suspended from the fastener.

If it is desired to lock or secure the bead of the cable to the fastener, the bead may be swaged or coined much as a rivet head as shown at 130 in FIG. 15. The head upon cold forming may flow into the hole 129 as indicated at 131 removing any looseness between the cable and fastener.

Figure 17:
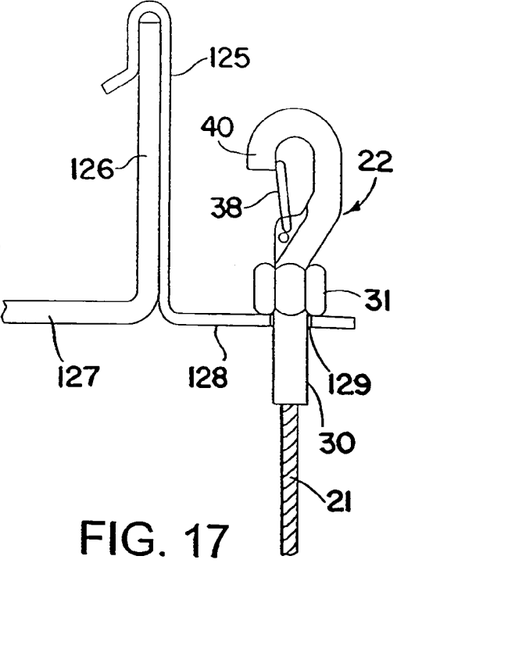
FIG. 17 is a similar view of the hooked end of the FIG. 1 embodiment being suspended from the purlin clip.

Referring now to FIG. 17, there is illustrated the same purlin and purlin clip with the hooked end embodiment suspended from the fastener in the same manner as the plain bead embodiment of FIG. 16. The free end 23 of the cable 21 is simply threaded down through the hole 129 and the enlarged hexagonal bead 31 won't fit through the hole. The cable or wire with the hooked end 22 is suspended as illustrated.

Figure 18:
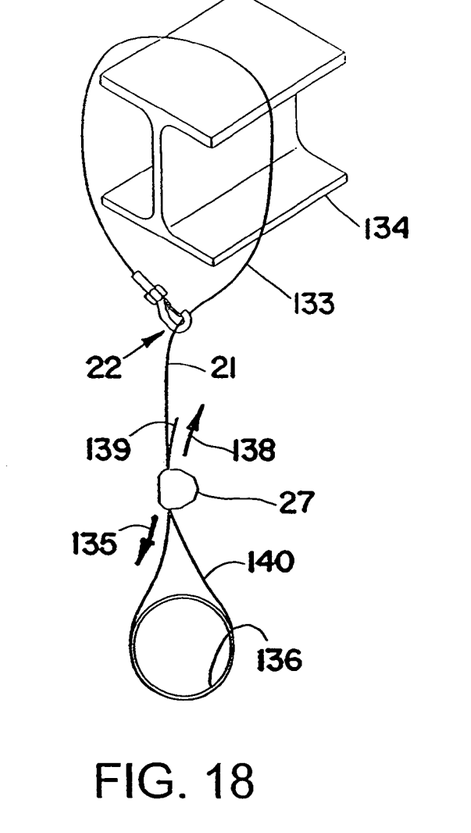
FIG. 18 is an illustration of the FIG. 1 embodiment supporting a pipe from an I-beam.

Referring now to FIG. 18, there is illustrated a simplified installation using a suspension system of the present invention. The cable 21 is formed into a loop 133 around I-beam 134 and the hooked end 22 is simply snapped onto the cable or wire as indicated to complete the loop which may be tightened by pulling downwardly on the cable or wire. The wire 21 is then threaded through one side of the jam cleat 27 in the direction of the arrow 135, around a pipe, for example, shown at 136, and then back through the jam cleat 27 as indicated by the arrow 138. By pulling on the end 139, the loop 140 formed around the pipe 136 may be tightened to the desired tautness.

If desired, a hand operated tightening tool may be employed. Once the two loops are formed and tightened and the pipe is suspended at the desired tautness from the structure 134, any excess cable or wire 21 may be simply snipped off.

Figure 19:
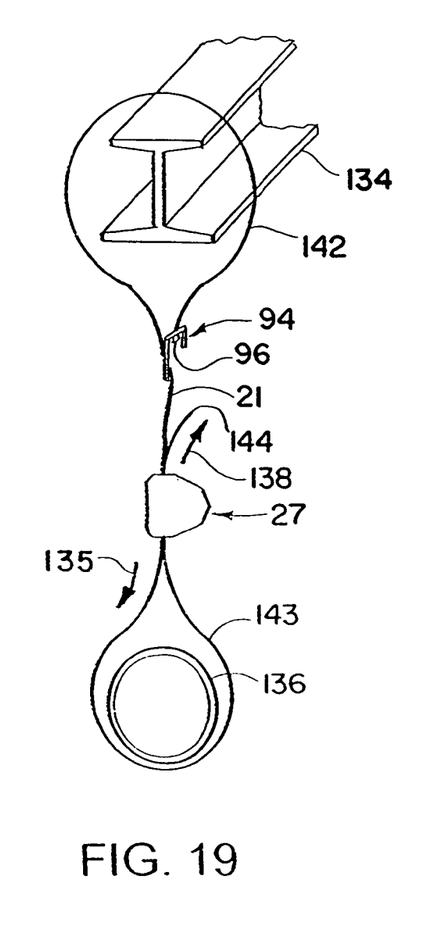
FIG. 19 is an illustration of the FIG. 11 embodiment supporting a pipe from an I-beam.

FIG. 19 illustrates the same simplified double loop system formed with the plain beaded embodiment of FIG. 11 incorporating the clip 94. In FIG. 19, the plain beaded end of the wire or cable 21 has been passed over the beam 134 to form a loop 142. The beaded end 96 is secured in the clip 94 as illustrated. The wire or cable is then threaded downwardly through one side of the jam cleat 27 as indicated by the arrow 135, and around pipe 136 forming loop 143. The wire or cable then passes through the opposite side of the jam cleat in the direction of the arrow 138. The cable may be pulled tight to tighten both ends and the excess may be simply cut off as indicated at 144.

Figure 20:
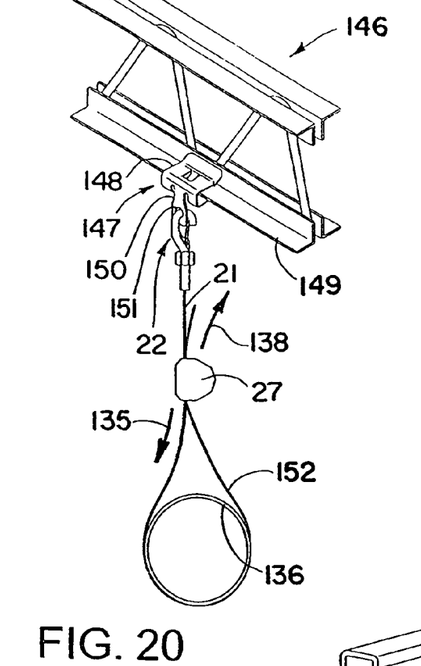
FIG. 20 is an illustration of the FIG. 1 embodiment supporting a pipe from a flange clip secured to a girder flange.

Referring now to FIG. 20, there is illustrated an open joist or girder 146 to which is secured a hammer-on flange clip shown at 147. The flange clip includes a generally U-shaped portion 148 which is hammered on and tightly grips the flange 149. A depending tab 150 includes hole 151. The flange clip 147 may be of the type sold under the afore noted trademark CADDY®.

The hooked upper end of the suspension system is simply engaged in the hole 151 and the cable 21 is threaded through the jam cleat 27 in the direction of the arrow 135, around pipe 136 to form loop 152 and then back through the opposite side of the jam cleat 27 in the direction of the arrow 138. In this manner, a loop does not have to be formed over or through the structure 146. The configuration of the hook is designed easily to snap into the hole in the depending tab of the clip 147.

Figure 21:
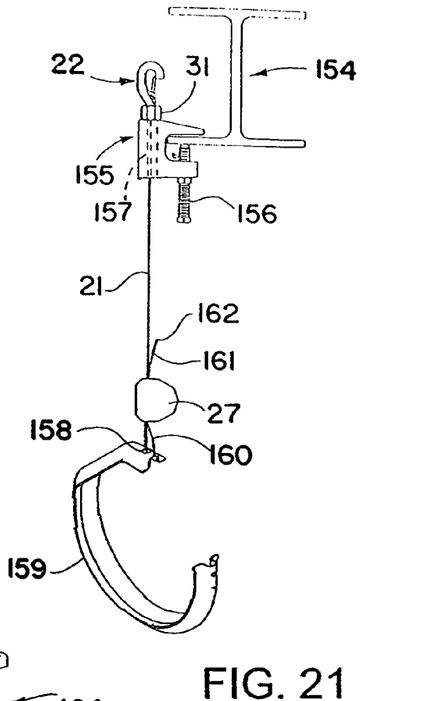
FIG. 21 is an illustration of the FIG. 1 embodiment supporting a cable tray bracket from a flange clamp.

Referring now to FIG. 21, there is illustrated a structure such as an I-beam 154. The I-beam has secured to its lower flange a flange clamp 155. The flange clamp 155 is generally U-shaped and is clamped to the flange by the clamp screw indicated at 156. The clamp is provided with a vertical hole shown at 157. The free end of the length of cable or wire is simply threaded down through the hole 157 and the hooked end 22 won't fit through the hole with the enlarged hexagonal bead 31 abutting the top of the clamp. The length of the cable is then threaded downwardly through the jam cleat 27 and through a hole 158 in the top of a cable tray bracket 159. The cable then extends back upwardly through the opposite side of the jam cleat 27 to form the relatively small loop shown at 160 and the free end 161 may be snipped off at 162.

Figure 22:
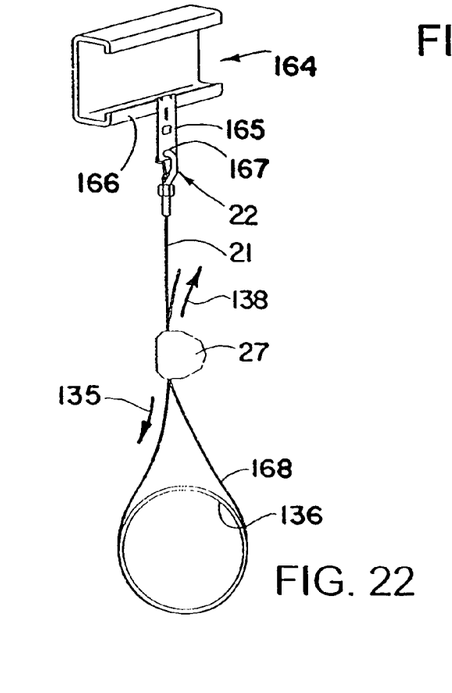
FIG. 22 is an illustration of the FIG. 1 embodiment supporting a pipe from a flange clip secured to a C-purlin.

FIG. 22 illustrates a C-purlin shown generally at 164 with a flange clip 165 secured to the lower flange 166 of the purlin. The flange clip is provided with a horizontally extending hole 167 at its lower end and the hooked end 22 is simply secured in the hole. The length of cable is then threaded down through the jam cleat 27 as shown by arrow 135 and around the pipe 136 to form loop 168, then back through the opposite side of the jam cleat as indicated by the arrow 138. The loop 168 may be tightened to position and suspend the pipe 136 with respect to the structural C-purlin 164.

Figure 23:
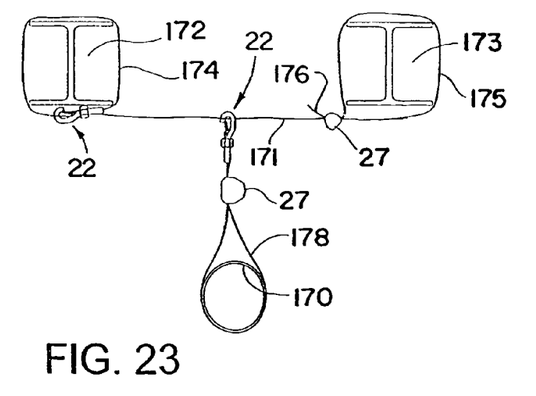
FIG. 23 is an illustration of a catenary installation where a first cable or wire kit is extended horizontally between two structures to form a catenary with the second kit being used to suspend a pipe from the first.

FIG. 23 illustrates two suspension systems supporting the pipe 170 on a catenary 171 extending between I-beams 172 and 173. The catenary 171 is formed by forming a loop 174 around the I-beam 172 using the hooked end 22 of one suspension system. Loop 175 is formed around the I-beam 173 utilizing the jam cleat 97 as illustrated. The wire or cable free end 176 may be pulled taut to control the tension of the catenary 171.

A second suspension kit is utilized to suspend the pipe 170 simply by engaging the hooked end 22 with the catenary 171 at the desired location. The cable is then extended through the jam cleat 97 to form loop 178 around the pipe 170. In this manner, the pipe may be suspended at essentially any location between the I-beams 172 and 173.

Figure 24:
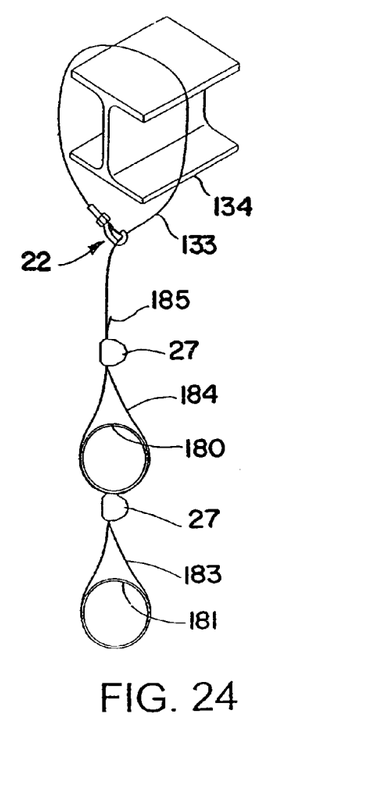
FIG. 24 is an illustration of a kit as seen in FIG. 1 being used with two jam cleats to suspend and support two pipes.

With reference to FIG. 24, two pipes illustrated at 180 and 181 are suspended from I-beam 134. A length of cable or wire forms a loop 133 around the I-beam 134 utilizing the hooked end 22. The wire then passes downwardly through upper jam cleat 27, and around the upper pipe 180 and into the lower jam cleat 27 and then around pipe 181 forming the loop 183. The wire or cable then passes upwardly through the lower jam cleat 27, around pipe 180 to form saddle or loop 184, and finally through the upper jam cleat 27. By pulling the wire or cable through the two jam cleats the tautness or position of the two pipes may be closely controlled. Any excess free end is then snipped off as indicated at 185.

Figure 25:
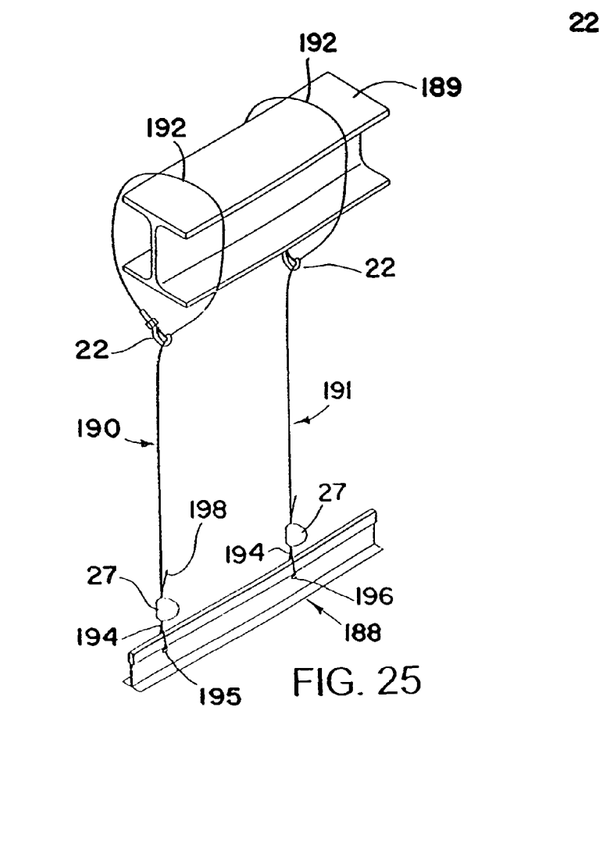
FIG. 25 is an illustration of a plurality of cable kits being used to support a ceiling grid.

Referring to FIG. 25 there is illustrated a T-grid member 188 such as used for suspended ceilings suspended from I-beam 189 by two suspension kits seen at 190 and 191. Each forms an upper loop 192 around the I-beam 189 utilizing the hooked end 22. The opposite end is then threaded through jam cleat 27 to form the respective relatively small loops 194 extending through the holes 195 and 196 in the stem of the T-grid 188. In each case the elevation of the T-grid may closely be controlled by using the free ends indicated at 198 to control the tautness and thus the elevation of the T-grid.

Figure 26:
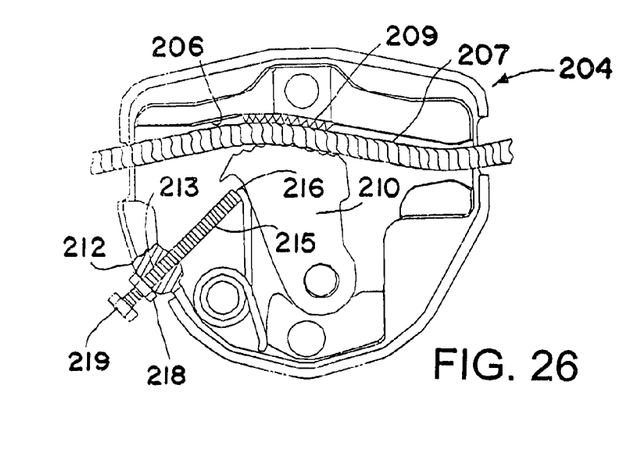
FIG. 26 is a partially broken and in section view like FIG. 7 of a modified jam cleat which may be locked in cable or wire gripping position particularly useful in seismic environments.

Referring now to FIG. 26, there is illustrated a jam cleat particularly useful in a seismic environment. The cleat shown generally at 204 may be somewhat larger than the cleat of FIG. 7. The curved gripping surface 206 for the cable 207 is provided with cast-in row of teeth or serrations shown generally at 209 opposite the serrations of the lever 210.

In addition, the cast body is provided with enlarged hubs or projections shown at 212 which include a threaded hole 213 each accommodating locking screw 215. The tip 216 of the locking screw when tightened bears against the back of the lever 210 or the coil spring tip. The screw may be secured against loosening by lock nut 218. The screw has a hex driving head as shown at 219 but may have a slotted or other type head. Both levers may be provided with such locking screws. Before the lever can be released the locking screw has to be released. In seismic zones where a building may be subject to swaying, vibrations, shocks or bouncing, the jam cleat cannot be released even if the cable is pulled or jerked to the left as seen in FIG. 26. It can be released only if the locking screw is retracted.

Figure 27:
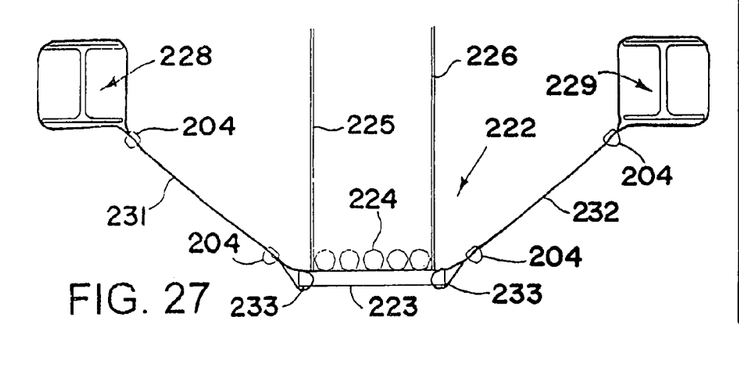
FIG. 27 illustrates a staying application for an electrical conduit trapeze using two cables and four of the seismic jam cleats.

Referring now to FIG. 27 there is illustrated the seismic cleat 204 applied to the support and staying of an electrical conduit or pipe trapeze shown generally at 222 which includes a horizontal frame or bar 223 on which the conduit 224 are positioned and which is hung or supported by elongated threaded hanger rod 225 and 226.

The pipe trapeze is diagonally stayed with respect to structural beams 228 and 229 by cables 231 and 232. One end of cable 231 is looped around beam 228 by passing the cable through the side-by-side passages of cleat 204. The opposite end of the cable is looped around a horizontal stringer of the trapeze as shown at 233 and back through jam cleat 204. The cable 232 is secured in the same way. Excess cable may simply be cut off. With the levers of each cleat locked in cable gripping position, the cleats are locked against release, and the trapeze is dampened against excess movement or swaying in the event of a seismic occurrence.

Referring now to FIGS. 28–35, there is illustrated a fixture cleat shown generally at 236 which may be assembled on the wire or cable at any location and which may be used to secure or hang objects without an encircling loop.

Figures 28, 29:
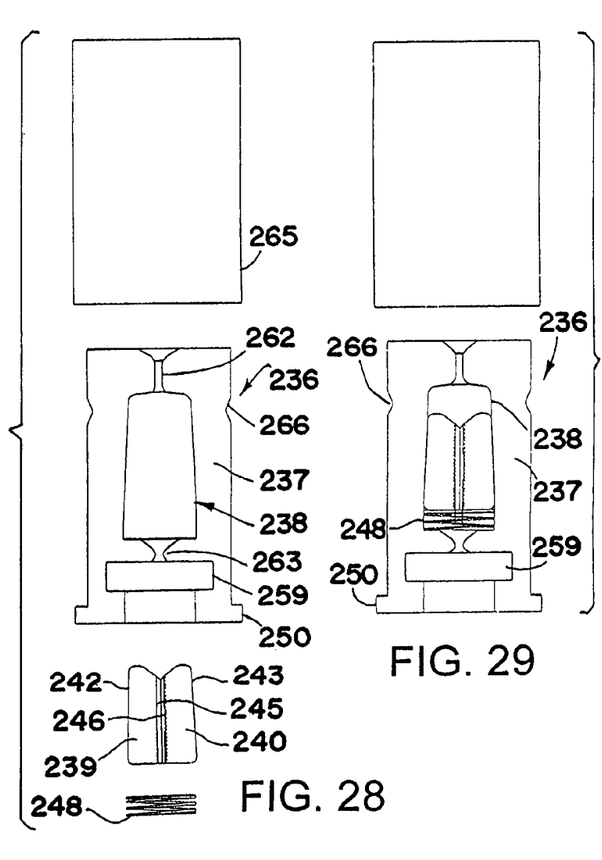
FIG. 28 is an exploded view of a fixture cleat which may be used to support objects without encircling or looping around the objects.
FIG. 29 is a view of the cleat of FIG. 28 partially assembled.

Referring first to FIGS. 28 and 29 the fixture cleat includes two semi-cylindrical bodies 237. These half round bodies when joined form a wedge chamber 238 accommodating wedge jaws 239 and 240. Both are provided with exterior wedge surfaces 242 and 243 of corresponding wedge angle to the interior of chamber 238. The interior of the wedges are provided with a wire or cable gripping toothed or serrated inner surface as seen at 245 and 246 to grip the cable or wire. A compression spring 248 seats in the larger end of the chamber and urges the jaws toward the smaller end and to be driven closed to grip the wire or cable.

The bottom of the body parts are provided with an exterior flange 250 and an internal T-shape half round recess shown at 259. The cable or wire can pass completely through the body and for this purpose the body parts are provided with accommodating wire or cable grooves both above and below the wedge chamber as shown at 262 and 263. The T-shape mating recesses are used to affix various types of intermediate fixtures or fittings for various applications as shown in FIGS. 30–35.

To lock the assembly on the cable a sleeve 265 is telescoped over the top of the half round joined body parts and seated against the flange 250. The exterior of the body parts are provided with a shallow U-shape girdling groove 266 and to lock the sleeve in place it is crimped into the groove by a suitable tool as shown at 267 in FIGS. 30–32.

Figure 30:
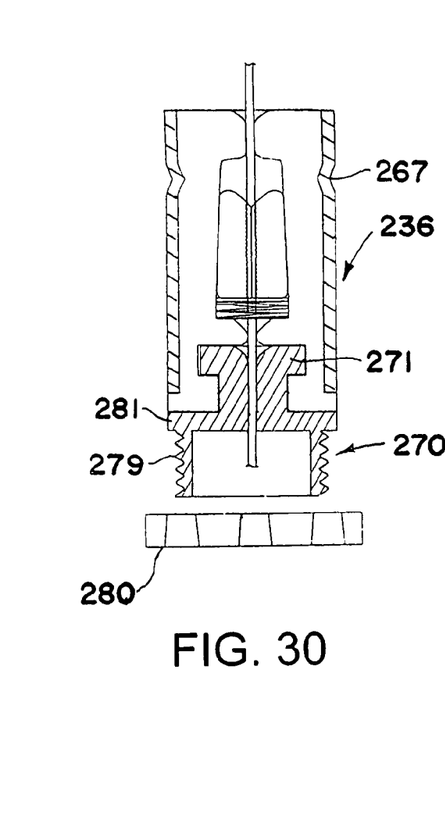
FIG. 30 is an assembled view showing the cleat supporting an electrical conduit type coupling and associated lock washer.
Figure 31:
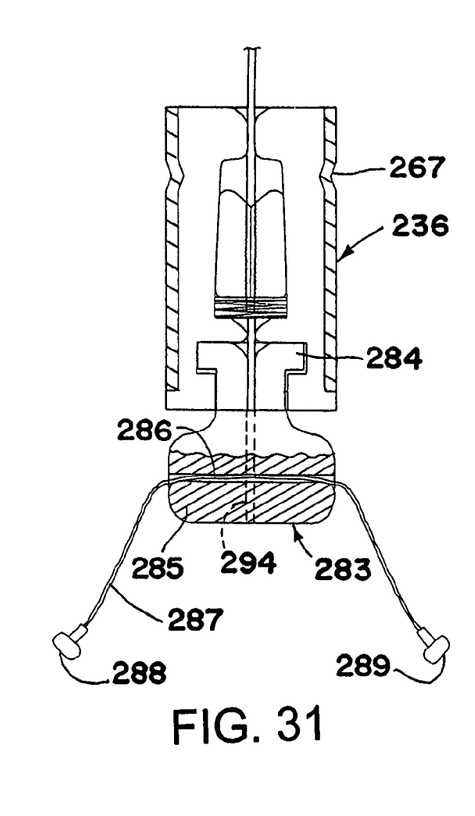
FIG. 31 is a view showing the fixture cleat assembled with a knob in turn supporting a sling for hanging certain types of fixtures.
Figure 32:
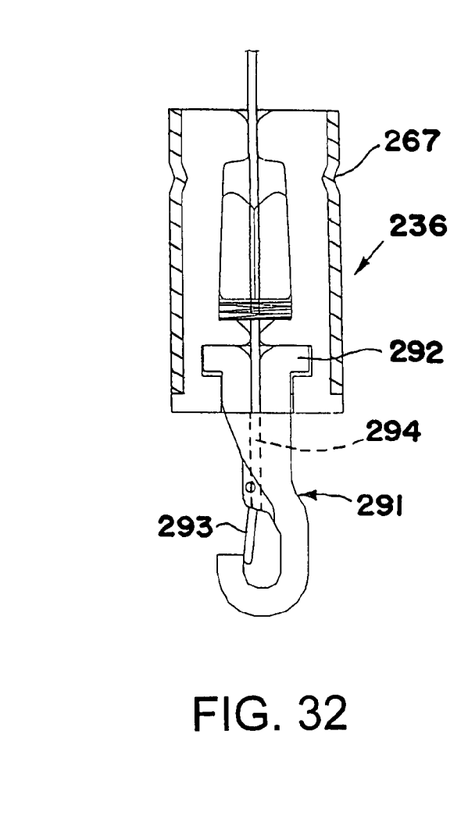
FIG. 32 is a view like FIGS. 30 and 31 showing the cleat supporting a hook.

Referring now to FIGS. 30–32 there are illustrated three different types of intermediate fixtures or fittings for various hanging or suspending applications, each secured in the round T-recess formed in the bottom of the fixture cleat when affixed to the wire or cable and locked in place by the sleeve.

As seen in FIG. 30 the intermediate fitting 270 is a two part device similar to a threaded electrical conduit coupling. It includes a mushroom cap or T-head 271 fitting in the recess 259 and a projecting larger diameter externally threaded sleeve 279 on which fits fingered lock nut 280. The sleeve projects from plate 281 which fits beneath the fixture cleat.

In FIG. 21 the intermediate fitting or fixture is an inverted bollard 283 having the T-head 284 and a projecting enlargement 285 with a transverse hole 286 accommodating secondary sling 287, having beads 288 and 289 on the respective ends.

The intermediate fitting or fixture of FIG. 32 is a hook 291 having the top T-head 292 and a spring latch 293 closing the opening of the hook.

It is noted that all three intermediate fittings may rotate on the axis of the fixture cleat and thus the cable, and that all three have cable accommodating passages such as seen at 294 so that the cleats may be assembled and adjusted on the cable. When finally positioned, excess cable may be snipped off.

Figure 33:
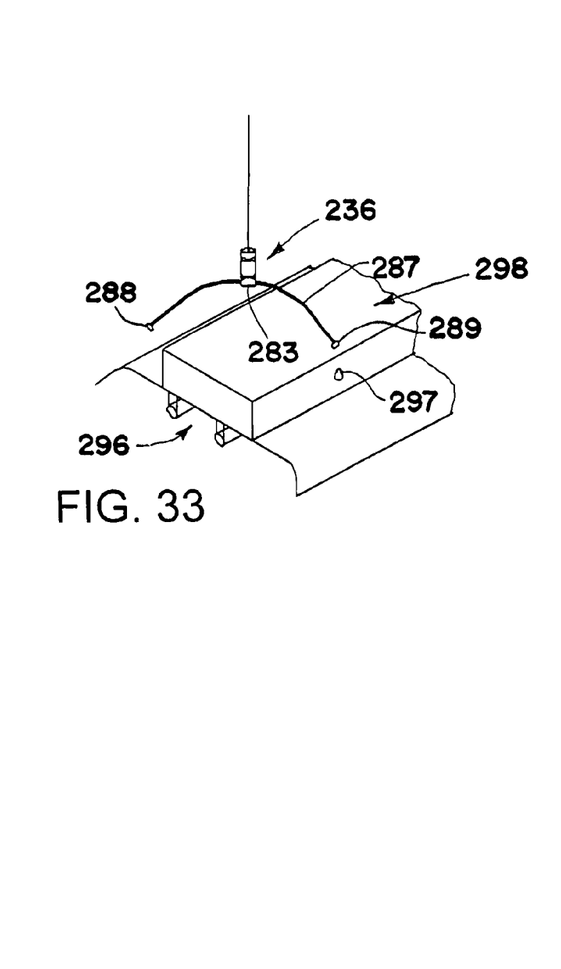
FIG. 33 is a fragmentary illustration of the cleat assembly of FIG. 31 and the manner of support of one type of light fixture.

Referring now to FIG. 33 the fixture cleat 236 with the intermediate fixture 283 of FIG. 31 is supporting light fixture 296. The beads 288 and 289 fit in key holes 297 on the side of the housing as shown at 298. Several such cables and fixtures may be employed. The upper end of the cables may be looped around a structure using the beaded hook or a jam cleat.

Figure 34:
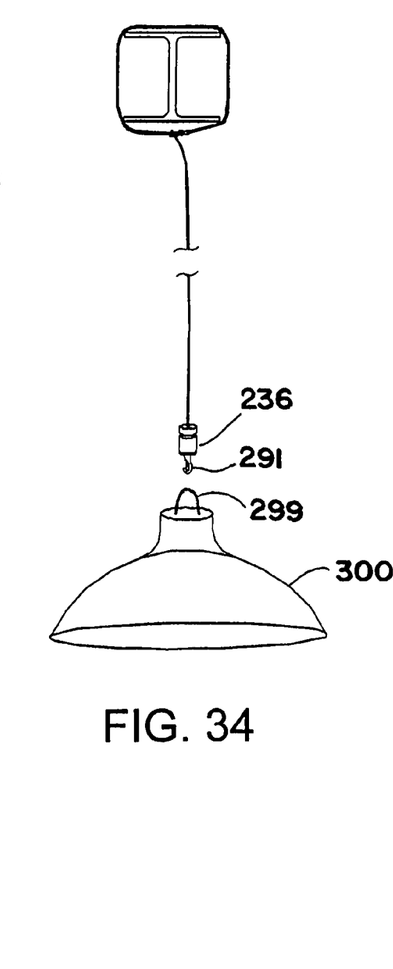
FIG. 34 is a similar view showing how the embodiment of FIG. 32 supports another type of fixture.

In FIG. 34 the hook intermediate fitting or fixture 291 is used to engage projecting bail 299 on fixture 300. In this manner the fixture is suspended from the cable and overhead structure.

Figure 35:
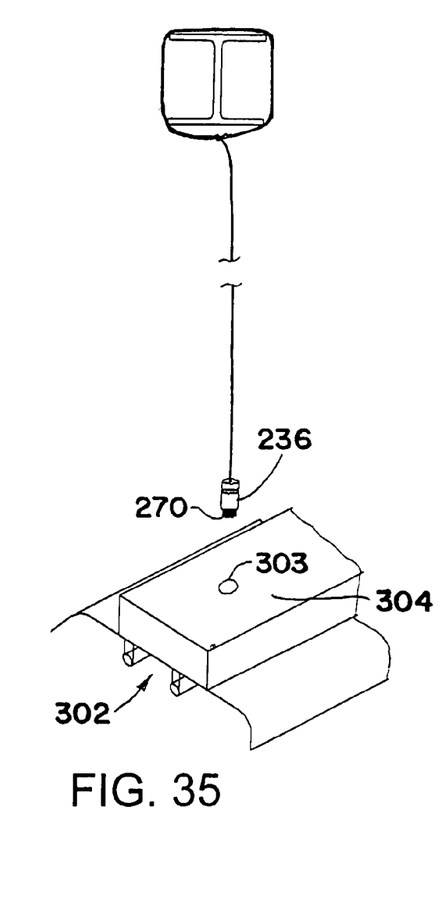
FIG. 35 shows how the embodiment of FIG. 30 supports the fixture illustrated.

In FIG. 35 the threaded intermediate fixture 270 is on fixture cleat 236 is used to support light fixture 302. A knockout 303 in the top of the housing 30 is removed and the threaded sleeve is inserted in the knockout. The nut 280 is secured on the sleeve from below the knockout.

All three of the illustrated applications show the support of a fixture or other object without the necessity of looping the object.

It will of course be appreciated that there are a wide variety of additional applications for the suspension systems of the present invention, many of which may utilize the clamps, clips or fasteners sold the under the CADDY® trademark. It will also appreciated that in addition to the catenary illustrated, in other applications the suspension system may not be plumb. Lateral or diagonal stays may be employed to minimize swaying, for example, in connection with water pipes or in certain seismic zones.

In any event, there is provided a suspension system or method which utilizes a length of cable or having a plain beaded end or a beaded and hooked end, and a free end quickly to form adjustable loops around supporting structures. A jam cleat with swinging locking levers or catches accommodating wires of various sizes forces the cable against a curved clamping surface providing ensured gripping of the cable when the adjustable loop around the structure is formed and tightened. One form of jam cleat may be locked in gripping position with enhanced gripping. Also a fixture cleat may be included for supporting objects without an encircling loop.

To the accomplishment of the foregoing and related ends, the invention then comprises the features particularly pointed out in the claims, these being indicative, however, of but a few of the various ways in which the principles of the invention may be employed.

The invention claimed is:

1. A cable stay system for staying an object with respect to a structure, said system comprising a length of cable secured at one end to said structure, single strand cleat means secured to said cable, means to secure said object to said cleat means in turn to secure and stay said object to said structure, wherein said single strand cleat means comprises a body having at least two parts surrounding the cable, a wedge chamber in said body, wedges in said chamber operative tightly to grip said cable, and means to lock said body around said cable.

2. A cable stay system as set forth in claim 1 wherein said object is a suspended light fixture, and including means to secure said light fixture to said body directly or indirectly to support said light fixture without looping the cable around the light fixture.

3. A cable stay system as set forth in claim 2 including a fitting in said body rotatable with respect to said body substantially on the axis of the cable.

4. A cable stay system as set forth in claim 3 wherein said body is a T-head fitting in a corresponding chamber in the bottom of said two parts.

5. A cable stay system as set forth in claim 4 including a central opening in said T-head fitting to accommodate said cable.

6. A cable stay system as set forth in claim 4 wherein said T-head includes an externally threaded sleeve adapted to receive a lock nut.

7. A cable stay system as set forth in claim 4 wherein said T-head includes a projecting bollard.

8. A cable stay system as set forth in claim 7 wherein said bollard includes a transverse passage adapted to accommodate a sling.

9. A cable stay system as set forth in claim 8 including the assembly of the sling, and beads on the ends of the sling.

10. A cable stay system as set forth in claim 4 wherein said T-head includes a hook.

11. A cable stay system as set forth in claim 10 wherein said hook includes a spring latch closing the opening of the hook.

12. A cable stay system as set forth in claim 2 including spring means in said wedge chamber operative to drive said wedges within the chamber to a cable gripping position.

13. A cable stay system as set forth in claim 12 wherein said chamber extends axially of the cable, and said wedges are driven axially of the cable by the spring.

14. A cable stay system as set forth in claim 13 wherein said wedges are provided with exterior wedge surfaces, and interior cable gripping surfaces.

15. A cable stay system as set forth in claim 14 wherein said interior cable gripping surfaces are toothed or serrated to grip the cable.

16. A cable stay system as set forth in claim 1 wherein said means to lock said body around said cable comprises a sleeve telescoped over one end of the body parts.

17. A cable stay system as set forth in claim 16 including a flange on the opposite end of the body parts against which said sleeve is seated.

18. A cable stay system as set forth in claim 17 including a crimp groove in said body parts whereby said sleeve may be crimped into said groove to lock it in place.

19. A cable stay system as set forth in claim 1 and means responsive to the pull between said object and structure to increase or decrease the grip proportionally.

20. A cable stay system as set forth in claim 1 wherein said object is a fixture, and means to secure a fixture to said body directly or indirectly to support said fixture without looping the cable around the fixture.

21. A cable stay system as set forth in claim 1 including a fitting in said body rotatable with respect to said body substantially on the axis of the cable.

22. A cable stay system as set forth in claim 1 wherein said body is a T-head fitting in a corresponding chamber in the bottom of said two parts.

23. A cable stay system as set forth in claim 22 including a central opening in said T-head fitting to accommodate said cable.

24. A cable stay system as set forth in claim 22 wherein said T-head includes an externally threaded sleeve adapted to receive a lock nut.

25. A cable stay system as set forth in claim 22 wherein said T-head includes a projecting bollard.

26. A cable stay system as set forth in claim 25 wherein said bollard includes a transverse passage accommodating a sling, and beads on the ends of the sling.

27. A cable stay system as set forth in claim 22 wherein said T-head includes a hook, and said hook includes a spring latch closing the opening of the hook.

28. A cable stay system as set forth in claim 1 including spring means in said wedge chamber operative to drive said wedges within the chamber to a cable gripping position.

29. A cable stay system as set forth in claim 28 wherein said chamber extends axially of the cable, and said wedges are driven axially of the cable by the spring.

30. A cable stay system as set forth in claim 29 wherein said wedges are provided with exterior wedge surfaces, and interior cable gripping surfaces.

31. A cable stay system as set forth in claim 30 wherein said interior cable gripping surfaces are toothed or serrated to grip the cable.

32. A cable stay system as set forth in claim 1 wherein said means to lock said body around said cable comprises a sleeve telescoped over one end of the body parts.

33. A cable stay system as set forth in claim 32 including a flange on the opposite end of the body parts against which said sleeve is seated.

34. A cable stay system as set forth in claim 33 including a crimp groove in said body parts whereby said sleeve may be crimped into said groove to lock it in place.

* * * * *